United States Patent
Janson et al.

(10) Patent No.: US 11,052,745 B1
(45) Date of Patent: Jul. 6, 2021

(54) POWERSPLIT HYBRID TRANSAXLES

(71) Applicant: FORD GLOBAL TECHNOLOGIES, LLC, Dearborn, MI (US)

(72) Inventors: David Allen Janson, Plymouth, MI (US); David Gon Oh, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/829,164

(22) Filed: Mar. 25, 2020

(51) Int. Cl.
*B60K 6/365* (2007.10)
*F16H 37/06* (2006.01)
*F16G 13/18* (2006.01)
*B60K 6/442* (2007.10)
*F16H 37/08* (2006.01)

(52) U.S. Cl.
CPC ............ *B60K 6/365* (2013.01); *B60K 6/442* (2013.01); *F16G 13/18* (2013.01); *F16H 37/06* (2013.01); *F16H 37/0833* (2013.01); *B60Y 2200/92* (2013.01)

(58) Field of Classification Search
None
See application file for complete search history.

(56) References Cited

U.S. PATENT DOCUMENTS

| | | | | |
|---|---|---|---|---|
| 4,589,303 A | * | 5/1986 | Roberts | F16H 37/0846 475/211 |
| 4,836,049 A | * | 6/1989 | Moan | F16H 37/0846 475/205 |
| 5,954,612 A | * | 9/1999 | Baxter, Jr. | B60K 17/3467 475/198 |
| 6,045,476 A | * | 4/2000 | Haka | B60K 17/344 180/248 |
| 6,106,428 A | * | 8/2000 | Koneda | F16H 37/022 475/210 |
| 6,155,364 A | * | 12/2000 | Nagano | H02K 7/006 180/65.235 |
| 6,589,128 B2 | * | 7/2003 | Bowen | B60K 6/52 475/5 |
| 7,004,296 B2 | * | 2/2006 | Heiartz | B60K 17/00 180/65.23 |
| 7,081,060 B2 | * | 7/2006 | Hata | B60L 50/16 475/5 |
| 7,163,483 B2 | * | 1/2007 | Haka | B60K 17/3467 180/241 |
| 7,402,121 B2 | * | 7/2008 | Youn | B60K 6/405 475/331 |
| 7,522,981 B2 | * | 4/2009 | Kim | B60W 20/13 701/36 |

(Continued)

*Primary Examiner* — Dirk Wright
(74) *Attorney, Agent, or Firm* — David B. Kelley; Carlson, Gaskey & Olds

(57) ABSTRACT

This disclosure describes powersplit hybrid transaxles for hybrid vehicles. An exemplary hybrid transaxle may include a dual sprocket assembly at least partially disposed between an engine and a first electric machine (e.g., a generator). A power transfer unit, such as a planetary gear set, may be nested within the dual sprocket assembly. Chains may operatively connect the power transfer unit to driven sprockets of a second electric machine (e.g., a traction motor) and a differential to provide torque to vehicle drive wheels. The proposed hybrid transaxles provide improved efficiency and compact packaging configurations.

20 Claims, 4 Drawing Sheets

(56) References Cited

U.S. PATENT DOCUMENTS

| | | | |
|---|---|---|---|
| 7,631,719 B2 * | 12/2009 | Wenthen | B60K 6/365 |
| | | | 180/243 |
| 8,979,694 B2 | 3/2015 | Holmes et al. | |
| 9,321,451 B2 | 4/2016 | Okubo et al. | |
| 9,809,105 B1 * | 11/2017 | Janson | F16H 37/0806 |
| 10,082,196 B2 * | 9/2018 | Janson | B60K 6/365 |
| 10,112,472 B2 | 10/2018 | Sugiyama et al. | |
| 10,245,951 B2 * | 4/2019 | Goleski | B60K 6/48 |
| 10,479,198 B2 * | 11/2019 | Drill | B60K 17/344 |
| 10,710,449 B2 * | 7/2020 | Sarnie | B60K 6/30 |
| 2017/0274753 A1 * | 9/2017 | Okuwaki | F16G 13/04 |
| 2019/0118639 A1 | 4/2019 | Hata et al. | |

* cited by examiner

POWERSPLIT HYBRID TRANSAXLES

TECHNICAL FIELD

This disclosure relates to hybrid vehicles, and more particularly to powersplit hybrid transaxles for hybrid vehicles.

BACKGROUND

The desire to reduce fuel consumption and emissions has been well documented. Therefore, electrified vehicles (e.g., hybrids (HEVs), plug-in hybrids (PHEVs), battery electric vehicles (BEVs, etc.) are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

Electrified vehicles with powersplit hybrid transaxles are known and typically include a planetary gear set that divides the mechanical power generated by the internal combustion engine into two power flow paths. A first power flow path is established by a first drive system that includes the internal combustion engine and a first electric machine, and a second power flow path is established by a second drive system that includes a second electric machine and a traction battery pack. The first and second drive systems are capable of generating torque, either separately or in combination with one another, to drive one or more sets of vehicle drive wheels. Efficiency and packaging are issues with powersplit hybrid transaxles.

SUMMARY

A transaxle according to an exemplary aspect of the present disclosure includes, among other things, an engine, a first electric machine operatively connected to the engine, a dual sprocket assembly at least partially disposed between the engine and the first electric machine, and a power transfer unit nested within the dual sprocket assembly.

In a further non-limiting embodiment of the foregoing transaxle, a second electric machine extends along a second central longitudinal axis that is offset from a first central longitudinal axis that extends through the engine and the first electric machine.

In a further non-limiting embodiment of either of the foregoing transaxles, a first chain operatively connects a first sprocket portion of the dual sprocket assembly and a final drive sprocket of the transaxle, and a second chain operatively connects a second sprocket portion of the dual sprocket assembly and a driven sprocket of the second electric machine.

In a further non-limiting embodiment of any of the foregoing transaxles, the first chain and the second chain are high efficiency chains.

In a further non-limiting embodiment of any of the foregoing transaxles, a third longitudinal axis extends through a differential. The third longitudinal axis is offset from both the first longitudinal axis and the second longitudinal axis.

In a further non-limiting embodiment of any of the foregoing transaxles, the first electric machine is a generator and the second electric machine is a traction motor.

In a further non-limiting embodiment of any of the foregoing transaxles, the power transfer unit is a planetary gear set that includes a sun gear, a plurality of planet gears carried by a carrier, and a ring gear.

In a further non-limiting embodiment of any of the foregoing transaxles, the sun gear is operatively coupled to the first electric machine, and the ring gear is fixedly coupled to a portion of the dual sprocket assembly.

In a further non-limiting embodiment of any of the foregoing transaxles, the planetary gear set is the sole planetary gear set of the transaxle.

In a further non-limiting embodiment of any of the foregoing transaxles, an actuator is configured to move a gear in and out of engagement with the dual sprocket assembly to switch the transaxle between a powersplit configuration and a series configuration.

A hybrid vehicle according to another exemplary aspect of the present disclosure includes, among other things, an engine, a first electric machine operatively connected to the engine, a dual sprocket assembly positioned between the engine and the first electric machine, a planetary gear set nested within the dual sprocket assembly, a second electric machine, a first chain operably engaged with a first sprocket portion of the dual sprocket assembly and a final drive sprocket, and a second chain operably engaged with a second sprocket portion of the dual sprocket assembly and a driven sprocket of the second electric machine.

In a further non-limiting embodiment of the foregoing hybrid vehicle, the first electric machine is a generator and the second electric machine is a traction motor.

In a further non-limiting embodiment of either of the foregoing hybrid vehicles, the first sprocket portion of the dual sprocket assembly includes a first outer diameter and the second sprocket portion of the dual sprocket assembly includes a second outer diameter. The second outer diameter is larger than the first outer diameter.

In a further non-limiting embodiment of any of the foregoing hybrid vehicles, the planetary gear set includes a sun gear, a plurality of planet gears carried by a carrier, and a ring gear.

In a further non-limiting embodiment of any of the foregoing hybrid vehicles, the sun gear is operatively coupled to the first electric machine through a shaft, and the ring gear is fixedly coupled to the second sprocket portion of the dual sprocket assembly.

In a further non-limiting embodiment of any of the foregoing hybrid vehicles, the planetary gear set is the sole planetary gear set of a transaxle of the hybrid vehicle.

In a further non-limiting embodiment of any of the foregoing hybrid vehicles, the dual sprocket assembly is positioned axially between the engine and the first electric machine.

In a further non-limiting embodiment of any of the foregoing hybrid vehicles, at least a portion of the dual sprocket assembly is positioned on an opposite side of the first electric machine from the engine.

In a further non-limiting embodiment of any of the foregoing hybrid vehicles, the engine and the first electric machine are disposed along a first central longitudinal axis, the second electric machine is disposed along a second central longitudinal axis, and the final drive sprocket is disposed along a third central longitudinal axis. The first, second, and third central longitudinal axes are each offset from one another to established a three-axis configuration.

In a further non-limiting embodiment of any of the foregoing hybrid vehicles, an actuator is configured to move a gear in and out of engagement with the dual sprocket assembly to switch the hybrid vehicle between a powersplit configuration and a series configuration.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes powersplit hybrid transaxles for hybrid vehicles. An exemplary hybrid transaxle may include a dual sprocket assembly at least partially disposed between an engine and a first electric machine (e.g., a generator). A power transfer unit, such as a planetary gear set, may be nested within the dual sprocket assembly. Chains may operatively connect the power transfer unit to driven sprockets of a second electric machine (e.g., a traction motor) and a differential to provide torque to vehicle drive wheels. The proposed hybrid transaxles provide improved efficiency and compact packaging configurations. These and other features are discussed in greater detail in the following paragraphs of this detailed description.

Figure 1:
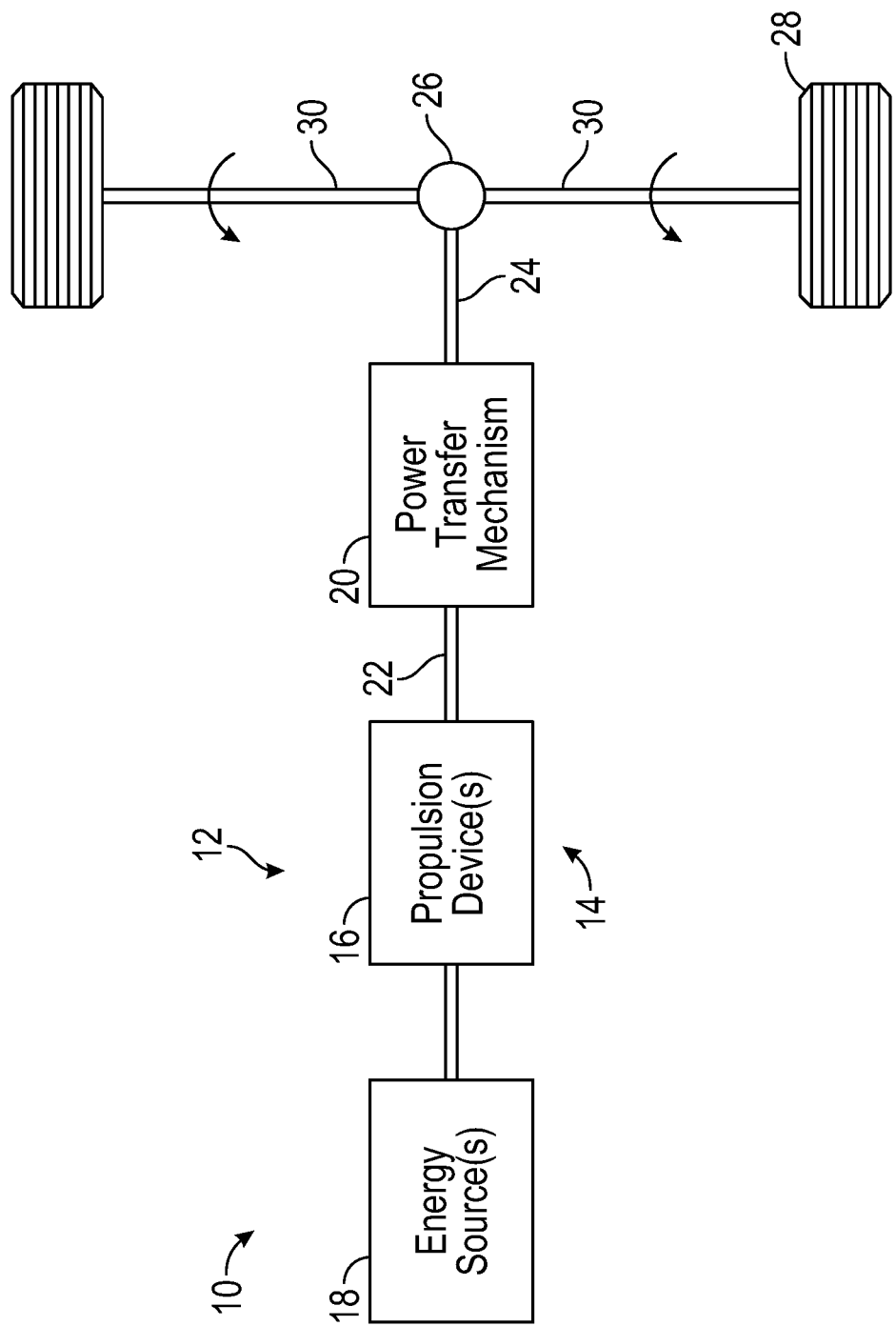
FIG. 1 schematically illustrates a powertrain of an electrified vehicle.

FIG. 1 schematically illustrates a powertrain 10 of an hybrid vehicle 12. The hybrid vehicle 12 could be a standard hybrid (HEV) or plug-in hybrid (PHEV) electric vehicle, for example. Therefore, the hybrid vehicle 12 may be powered by one or more electric machines in addition to an internal combustion engine.

The powertrain 10 may include a transaxle 14 having one or more propulsion device(s) 16. Each propulsion device 16 may be employed as an available drive source for powering the hybrid vehicle 12. In an embodiment, the propulsion device 16 includes both an internal combustion engine and one or more electric machines.

One or more energy source(s) 18 may supply power to the propulsion device(s) 14. The energy source 18 may include both a fuel system and a high voltage traction battery pack. The fuel system may provide power to an engine, and the high voltage traction battery pack may provide power to an electric machine, for example. The high voltage traction battery pack may include a plurality of battery assemblies (i.e., battery arrays or groupings of battery cells) capable of outputting electrical power to operate the various electrical loads of the hybrid vehicle 12.

The transaxle 14 may additionally include a power transfer mechanism 20 for multiple power sources. The power transfer mechanism 20, which is shown schematically, may include powersplit mechanisms for transferring power from multiple power sources between an input shaft 22 and an output shaft 24 of the transaxle 14. The power transfer mechanism 20 provides powertrain output torque to the output shaft 24.

The output shaft 24 may be connected to a differential 26 of the transaxle 14. The differential 26 drives a pair of wheels 28 via respective axles 30 that are connected to the differential 26 to propel the hybrid vehicle 12. The transaxle 14 may be configured as a front wheel drive, rear wheel drive, or all-wheel drive platform.

The powertrain 10 of FIG. 1 is highly schematic and is not intended to limit this disclosure. Various additional components could alternatively or additionally be employed by the powertrain 10 within the scope of this disclosure. In addition, the teachings of this disclosure may be incorporated into any type of vehicle, including but not limited to, cars, trucks, vans, sport utility vehicles (SUVs), boats, planes, etc.

Figure 2:
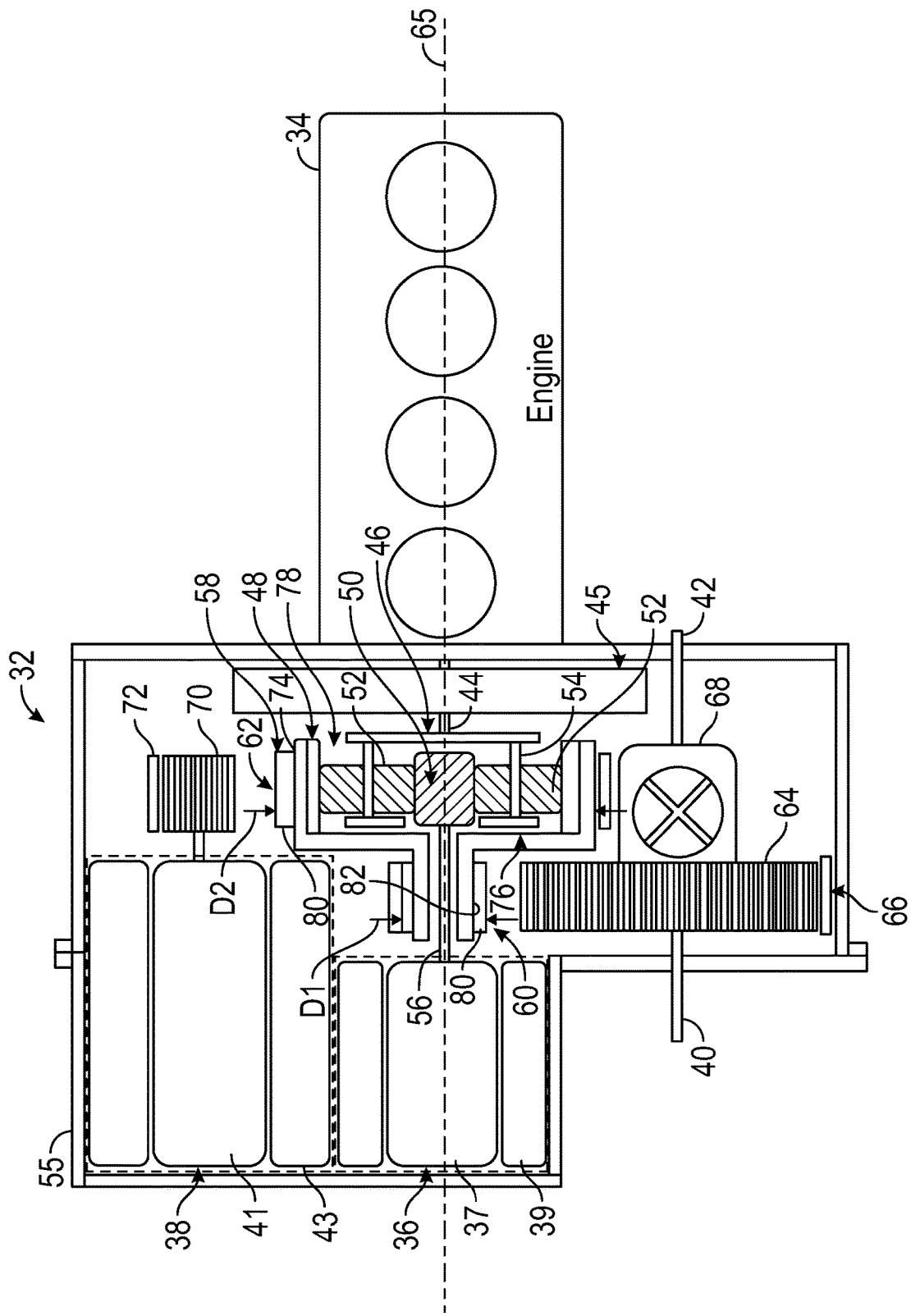
FIG. 2 schematically illustrates an exemplary hybrid transaxle for an electrified vehicle.

FIG. 2 schematically illustrates an exemplary transaxle 32 that may be employed by an electrified vehicle, such as the hybrid vehicle 12 of FIG. 1. In an embodiment, the transaxle 32 is a powersplit hybrid transaxle suitable for use within a HEV or a PHEV.

The transaxle 32 may employ first and second drive systems for powering the drive wheels of a vehicle. The first drive system may include a combination of an engine 34 and a generator 36 (i.e., a first electric machine), and the second drive system may include at least a traction motor 38 (i.e., a second electric machine) that is powered by a traction battery pack (not shown). In the illustrated example, the second drive system is considered an electric drive system of the transaxle 32. The first and second drive systems are configured to generate torque for driving one or more sets of vehicle drive wheels. Power may be conveyed to the vehicle drive wheels via half shafts 40 and 42.

The generator 36 may include a rotor 37 received within a stator 39. The rotor 37 may rotate relative to the stator 39.

The traction motor 38 may also include a rotor 41 received within a stator 43. The rotor 41 may rotate relative to the stator 43.

Power may be received mechanically via an input shaft 44 of the engine 34, which in an embodiment is an internal combustion engine. The generator 36 may be connected to the input shaft 44 through a power transfer unit 46, such as a planetary gear set. Of course, other types of power transfer units, including other gear sets and transmission gearboxes, may be used to operatively connect the input shaft 44 of the engine 34 to the generator 36.

In an embodiment, the power transfer unit 46 is a planetary gear set that includes a ring gear 48, a sun gear 50, planet gears 52, and a carrier 54. The planet gears 52 are supported by the carrier 54, which rotates in unison with the input shaft 44, and mesh with both the ring gear 48 and the sun gear 50 to establish a gear ratio of the power transfer unit 46.

The sun gear 50 may be fixedly coupled to the generator 36 such that the generator 36 can be driven by the engine 34 through the power transfer unit 46 to convert kinetic energy to electrical energy. The generator 36 can alternatively function as a motor to convert electrical energy into kinetic energy, thereby outputting torque to a shaft 56 connected to the power transfer unit 46 (i.e., through the sun gear 50). Because the generator 36 is operatively connected to the engine 34, the speed of the engine 34 can be controlled by the generator 36.

A vibration damper assembly 45 may optionally be positioned between the engine 34 and the power transfer unit 46. The vibration damper assembly 45 may include a torsion spring or any other mechanical device that is capable of absorbing vibration forces originating from the engine 34. The vibration damper assembly 45 may be packaged either inside or outside a housing 55 of the transaxle 32. In an embodiment, the majority of the components of the transaxle 32, excluding the engine 34, are packaged inside the housing 55.

Figure 5:
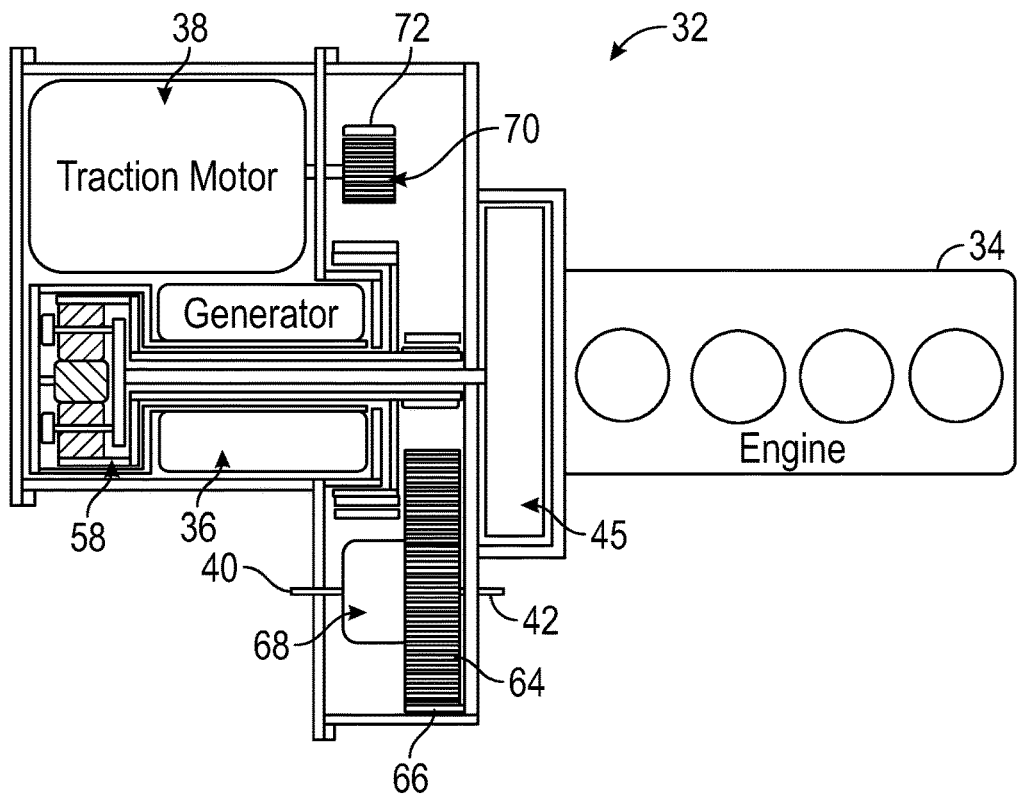
FIG. 5 schematically illustrates yet another exemplary hybrid transaxle for an electrified vehicle.

The power transfer unit 46 may be nested within a dual sprocket assembly 58. The dual sprocket assembly 58 may be disposed axially between the engine 34 and the generator 36. However, other packaging configurations of the dual sprocket assembly 58 are also contemplated, including those in which at least a portion of the dual sprocket assembly 58 is positioned on an opposite side of the generator 36 from the engine 34, for example (see FIG. 5).

The dual sprocket assembly 58 may include a first sprocket portion 60 and a second sprocket portion 62 that are each supported for rotation about a first central longitudinal axis 65 that extends through the engine 34 and the generator 36. The ring gear 48 of the power transfer unit 46 may be fixedly coupled to the second sprocket portion 62 of the dual sprocket assembly 58.

In an embodiment, the power transfer unit 46 is nested within the second sprocket portion 62 of the dual sprocket assembly 58. For example, the second sprocket portion 60 may include an outer circumferential wall 74 and a rear wall 76. The outer circumferential wall 74 extends forward of the rear wall 76 to establish a recess 78. The power transfer unit 46 may be received within the recess 78.

The first sprocket portion 60 may extend from the rear wall 76 of the second sprocket portion 62 in a direction toward the generator 36. An outer diameter D1 of the first sprocket portion 60 may be smaller than an outer diameter D2 of the second sprocket portion 62, in an embodiment.

Each of the first sprocket portion 60 and the second sprocket portion 62 include projections 80, such as teeth or cogs, for operatively engaging chains (see features 66 and 72), tracks, or other perforated indented components. The projections 80 of the first sprocket portion 60 may extend radially outwardly from an outer circumferential wall 82, and the projections 80 of the second sprocket portion 62 extend radially outwardly from the outer circumferential wall 74.

The first sprocket portion 60 of the dual sprocket assembly 58 may be operatively connected to a final drive sprocket 64 of the transaxle 32 by a first chain 66. The final drive sprocket 64 may be operatively connected to a differential 68. The first chain 66 is therefore configured to transfer torque from the engine 34 to the differential 68 for providing traction to the vehicle drive wheels through the half shafts 40, 42.

The traction motor 38 can also be employed, either alone or in combination with the engine 34, to drive the vehicle drive wheels by outputting torque to the power transfer unit 46. For example, a driven sprocket 70 of the traction motor 38 may be operatively connected to the second sprocket portion 62 of the dual sprocket assembly 58 by a second chain 72. Torque from the traction motor 38 may be transferred from the traction motor 38, through the second chain 72, then through the first chain 66, and then to the differential 68 for providing traction to the vehicle drive wheels via the half shafts 40, 42.

In an embodiment, the first chain 66 and the second chain 72 are high efficiency chains. The first and second chains 66, 72 may therefore deliver reduced noise, vibration, and harshness as compared to geared drives. The chain pitch, width, and other design characteristics of the first and second chains 66, 72 can be balanced based on various design criteria to achieve highly efficient power transmission within the transaxle 32.

A ratio may be defined between the various sprocket pairs of the transaxle 32. In an embodiment, a ratio of the various sprocket pairs may be between about 2.5:1 and about 5:1. This ratio range may apply to the ratio between the second sprocket portion 62 and the first sprocket portion 60, between the second sprocket portion 62 and the driven sprocket 70, and between the final drive sprocket 64 and the first sprocket portion 60.

Because the traction motor 38 is operatively connected to the differential 68 through the first and second chains 66, 72, a separate gear set is not required for achieving all-electric propulsion within the transaxle 32. Thus, only a single planetary gear set is required for transferring torque through the transaxle 32. The exemplary transaxle 32 therefore embodies a more compact packaging configuration compared to prior powersplit hybrid transaxle designs.

Figure 3:
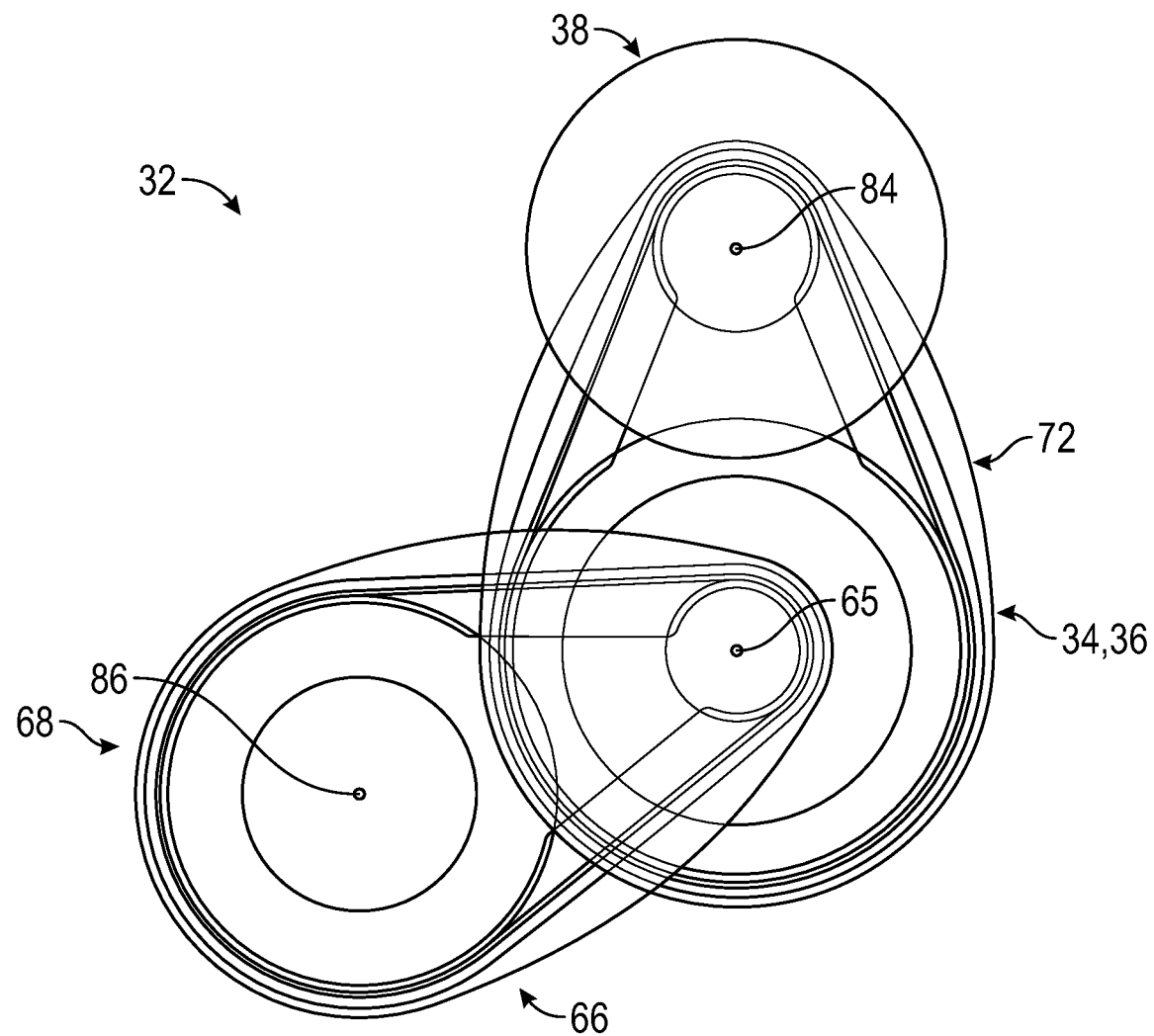
FIG. 3 illustrates an exemplary three-axis configuration of the hybrid transaxle of FIG. 2.

Referring now primarily to FIG. 3, the transaxle 32 may embody a three-axis configuration. For example, a first central longitudinal axis 65 may extend through the engine 34 and the generator 36, a second central longitudinal axis 84 may extend through the traction motor 38, and a third central longitudinal axis 86 may extend through the differential 68. In an embodiment, the second central longitudinal axis 84 may be offset from the first central longitudinal axis 65 in a first direction, and the third central longitudinal axis 86 may be offset from the first central longitudinal axis 65 in a second direction. Combined with the use of the first and second chains 66, 72, the three-axis configuration enables a highly efficient and compact powersplit hybrid design.

Figure 4:
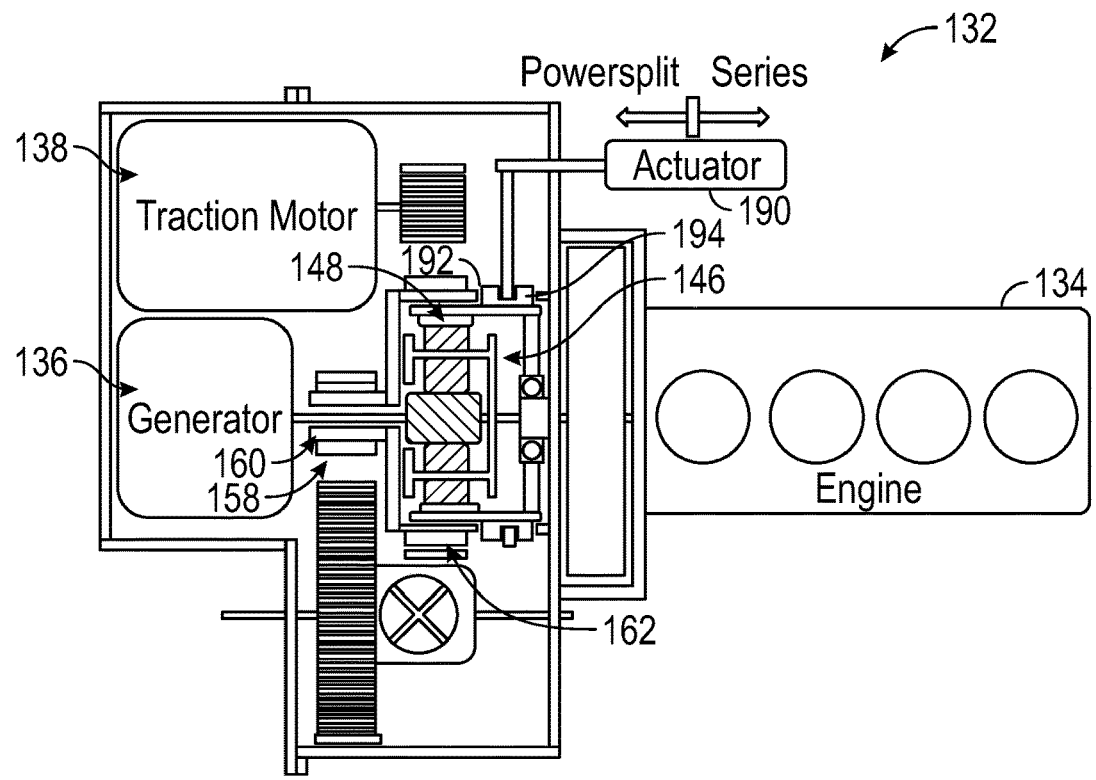
FIG. 4 schematically illustrates another exemplary hybrid transaxle for an electrified vehicle.

FIG. 4 schematically illustrates another exemplary transaxle 132. The transaxle 132 is similar to the transaxle 32 described above. However, in this embodiment, the transaxle 132 additionally includes an actuator 190 configured for switching the transaxle 132 between a powersplit configuration and a series configuration. In the powersplit configuration, the drive wheels of the vehicle may be powered by the engine 134 and the traction motor 138 simultaneously, whereas in the series configuration, the drive wheels of the vehicle are only powered by the engine 134 through the generator 136. The series configuration may provide improved reverse capabilities and low battery performance.

In this embodiment, a ring gear 148 of a power transfer unit 146 is separate from a second sprocket portion 162 of a dual sprocket assembly 158. The second sprocket portion 162 may include a groove 192 that receives a gear 194 that is operatively connected to the actuator 190. The gear 194 may be moved (to the left in FIG. 4) within the groove 192 by the actuator 190 to force the ring gear 148 into engagement with the second sprocket portion 162, thereby enabling the powersplit configuration. Alternatively, the gear 194 may be moved (to the right in FIG. 4) within the groove 192 by the actuator 190 to force the ring gear 148 out of engagement with the second sprocket portion 162, thereby enabling the series configuration.

The exemplary hybrid transaxles of this disclosure employ a unique dual sprocket assembly for housing a single planetary gear seat. A combination of the dual sprocket assembly and chains enables a traction motor to be operatively connected to a final drive of the transaxle without requiring any additional gear sets. Therefore, only a single planetary gear set is required for transferring torque to the vehicle drive wheels. The exemplary hybrid transaxles of this disclosure therefore provide more compact packaging configurations and are more efficient compared to prior powersplit hybrid transaxle designs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A transaxle, comprising:
an engine;
a first electric machine operatively connected to the engine;
a dual sprocket assembly at least partially disposed between the engine and the first electric machine; and
a power transfer unit nested within the dual sprocket assembly.

2. The transaxle as recited in claim 1, comprising a second electric machine extending along a second central longitudinal axis that is offset from a first central longitudinal axis that extends through the engine and the first electric machine.

3. The transaxle as recited in claim 2, comprising:
a first chain operatively connecting a first sprocket portion of the dual sprocket assembly and a final drive sprocket of the transaxle; and
a second chain operatively connecting a second sprocket portion of the dual sprocket assembly and a driven sprocket of the second electric machine.

4. The transaxle as recited in claim 3, wherein the first chain and the second chain are high efficiency chains.

5. The transaxle as recited in claim 2, comprising a third longitudinal axis that extends through a differential, wherein the third longitudinal axis is offset from both the first longitudinal axis and the second longitudinal axis.

6. The transaxle as recited in claim 2, wherein the first electric machine is a generator and the second electric machine is a traction motor.

7. The transaxle as recited in claim 1, wherein the power transfer unit is a planetary gear set that includes a sun gear, a plurality of planet gears carried by a carrier, and a ring gear.

8. The transaxle as recited in claim 7, wherein the sun gear is operatively coupled to the first electric machine, and the ring gear is fixedly coupled to a portion of the dual sprocket assembly.

9. The transaxle as recited in claim 7, wherein the planetary gear set is the sole planetary gear set of the transaxle.

10. The transaxle as recited in claim 1, comprising an actuator configured to move a gear in and out of engagement with the dual sprocket assembly to switch the transaxle between a powersplit configuration and a series configuration.

11. A hybrid vehicle, comprising:
an engine;
a first electric machine operatively connected to the engine;
a dual sprocket assembly positioned between the engine and the first electric machine;
a planetary gear set nested within the dual sprocket assembly;
a second electric machine;
a first chain operably engaged with a first sprocket portion of the dual sprocket assembly and a final drive sprocket; and
a second chain operably engaged with a second sprocket portion of the dual sprocket assembly and a driven sprocket of the second electric machine.

12. The hybrid vehicle as recited in claim 11, wherein the first electric machine is a generator and the second electric machine is a traction motor.

13. The hybrid vehicle as recited in claim 11, wherein the first sprocket portion of the dual sprocket assembly includes a first outer diameter and the second sprocket portion of the dual sprocket assembly includes a second outer diameter, and further wherein the second outer diameter is larger than the first outer diameter.

14. The hybrid vehicle as recited in claim 11, wherein the planetary gear set includes a sun gear, a plurality of planet gears carried by a carrier, and a ring gear.

15. The hybrid vehicle as recited in claim 14, wherein the sun gear is operatively coupled to the first electric machine through a shaft, and the ring gear is fixedly coupled to the second sprocket portion of the dual sprocket assembly.

16. The hybrid vehicle as recited in claim 11, wherein the planetary gear set is the sole planetary gear set of a transaxle of the hybrid vehicle.

17. The hybrid vehicle as recited in claim 11, wherein the dual sprocket assembly is positioned axially between the engine and the first electric machine.

18. The hybrid vehicle as recited in claim 11, wherein at least a portion of the dual sprocket assembly is positioned on an opposite side of the first electric machine from the engine.

19. The hybrid vehicle as recited in claim 11, wherein the engine and the first electric machine are disposed along a first central longitudinal axis, the second electric machine is disposed along a second central longitudinal axis, and the final drive sprocket is disposed along a third central longitudinal axis, wherein the first, second, and third central longitudinal axes are each offset from one another to established a three-axis configuration.

20. The hybrid vehicle as recited in claim 11, comprising an actuator configured to move a gear in and out of engagement with the dual sprocket assembly to switch the hybrid vehicle between a powersplit configuration and a series configuration.

* * * * *